Figure 1:
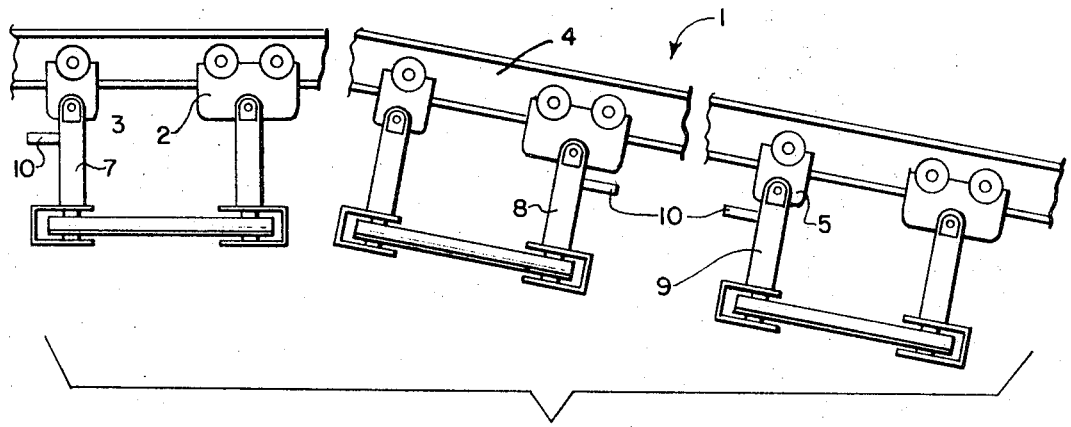
Figure 2:
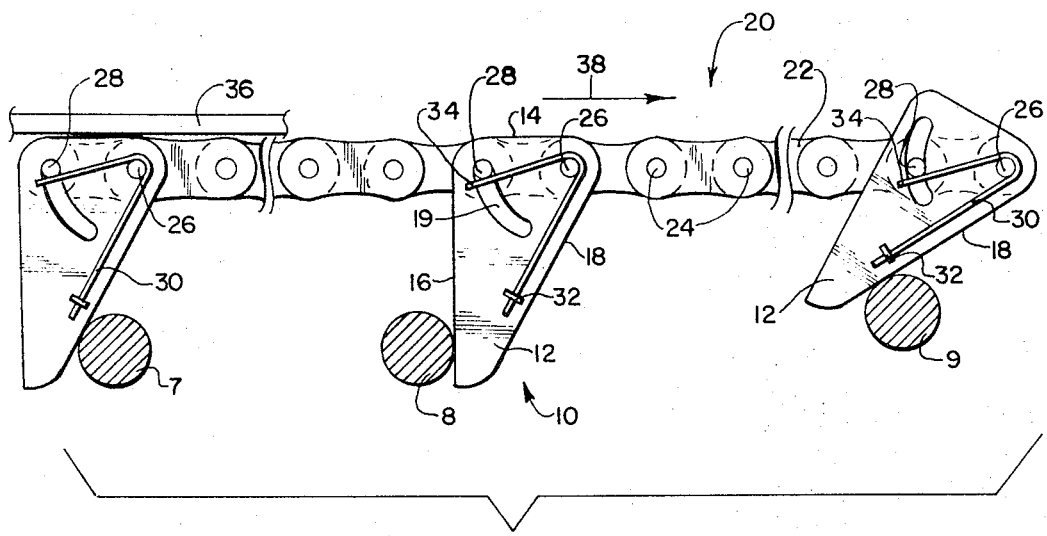
Figure 3:
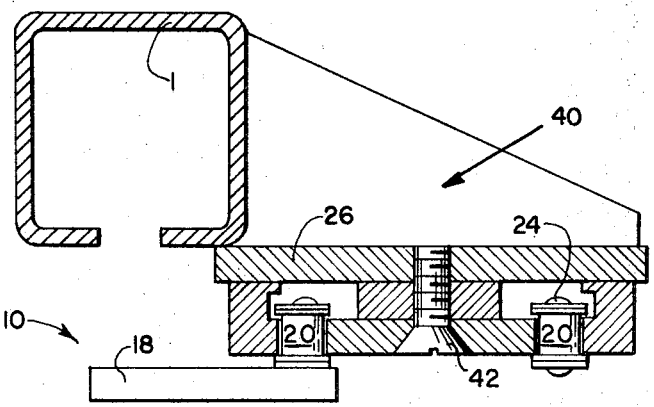
Figure 4:
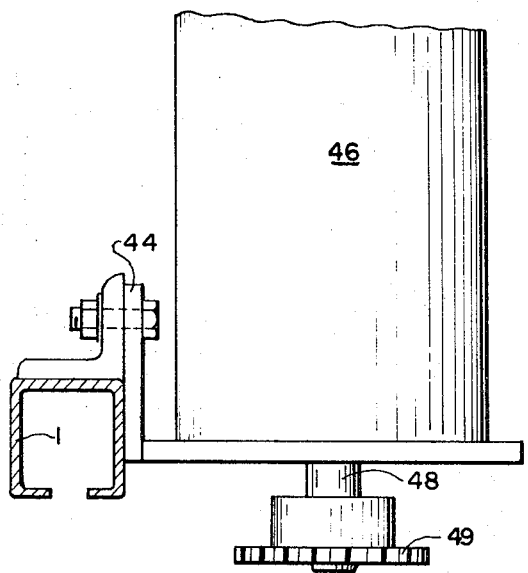
Figure 5:
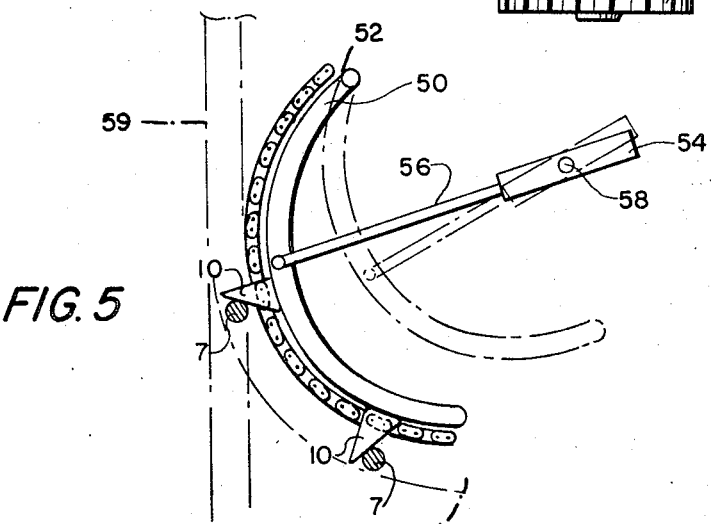

United States Patent

[11] 3,565,012

[72] Inventor Richard E. Nearman
 Mount Airy, Md.
[21] Appl. No. 769,202
[22] Filed Oct. 21, 1968
[45] Patented Feb. 23, 1971
[73] Assignee Eaton Yale & Towne, Inc.
 Cleveland, Ohio
 a corporation of Ohio

[54] CONVEYOR CARRIER CONTROL SYSTEM
 9 Claims, 5 Drawing Figs.
[52] U.S. Cl. ................................................. 104/172,
 198/170
[51] Int. Cl. ........................................ B65g 17/42,
 B65g 17/18
[50] Field of Search ......................................... 104/172,
 178; 198/170

[56] References Cited
 UNITED STATES PATENTS
 795,124 7/1905 Hetzel .......................... 104/172
 2,040,353 5/1936 Wilson ......................... 198/170

| 3,048,123 | 8/1962 | Burmeister et al. | 104/178 |
| 3,088,419 | 5/1963 | Bishop | 104/178 |
| 3,418,948 | 12/1968 | Fromme et al. | 104/178 |

FOREIGN PATENTS
| 295,120 | 8/1928 | Great Britain | 104/172 |

*Primary Examiner*—Arthur L. La Point
*Assistant Examiner*—Robert W. Saifer
*Attorney*—Littlepage, Quaintance, and Wray

ABSTRACT: A carrier retarding and selective driving device for power and free conveyor systems is described herein. The retarder has a chain which is driven parallel to a track and blocks which are spring loaded to extend from the chain toward the track to prevent free movement of the carriers along the track at speeds greater than that of blocks, to override trolleys overtaken by the blocks, and to drive trolleys when override disabling bars are positioned against backs of the blocks.

PATENTED FEB 23 1971 3,565,012

SHEET 1 OF 2

INVENTOR
RICHARD E. NEARMAN

BY Littlepage, Quaintance & Wray

ATTORNEYS

PATENTED FEB23 1971 3,565,012

INVENTOR
RICHARD E. NEARMAN

BY *Littlepage, Quaintance & Wray*

ATTORNEYS

CONVEYOR CARRIER CONTROL SYSTEM

BACKGROUND OF THE INVENTION

Power and free conveyor systems have gained wide use in materials handling. Trolleys and carriers, move freely along a track and are pushed along the track by chains and pushers which selectively engage and disengage trolleys. Trolleys and carriers in motion, particularly heavily loaded carriers gain considerable momentum which must be dispersed as the trolleys and carriers are stopped. Since the trolleys are constructed to roll along the track with as little friction as possible, the rolling contact with the track offers little braking for the trolleys. Thus, it is often convenient and necessary to use trolley slowing and arresting apparatus.

Many warehousing systems which are equipped with power and free conveyors employ main or feeder conveyors which carry trolleys and carriers around the warehouses to and from storage conveyors or racks. It is convenient to use storage conveyors which use the force of gravity to move the trolleys, carriers and goods thereon. Such storage conveyors are inclined very slightly from a point on the main conveyor, so that when the trolleys are switched on to the storage conveyor they will enter that conveyor and roll to the bottom of the incline, where a series of trolleys, carriers and goods may be stored. Removing the goods from the warehouse involves simply switching the storage track into communication with the main track and allowing a selected number of trolleys to roll therefrom onto the track. Alternatively, some power source may be used to drive trolleys from the storage track to the main track. Because of the very small frictional loses, once trolleys are placed upon an inclined track they accelerate rapidly toward the lower end. Rapidly accelerating and gaining momentum and finally striking stops or stopped trolleys at lower ends of the tracks is damaging to the trolleys and tracks and goods thereon and causes maintenance problems and necessitates the building of trolleys, carriers and tracks with more mass than is required to simply carry and store the goods. The need for retarding devices is readily apparent. Some retarding devices have been employed, but no retarder has provided the advantages of the present system.

Moreover, when trolleys are switched from and to main tracks, separate power sources are required to insure that the trolleys move off the tracks. Separate drives which are comparable to the drive along the main track may be employed, but such drives usually are unsuited economically and spacially to the requirements of storage tracks. Heretofore, no successful retarder has been combined with a trolley drive for moving trolleys into a storage rack and slowing and stopping the trolleys with the same apparatus.

An additional problem has also existed in the use of retarders, and that is, when retarding elements are positioned in the path of travel of trolleys, carriers or goods thereon, herein interchangeably referred to as devices or articles, difficulty is experienced in passing or overriding devices stopped in the track. The present invention provides a solution to that difficulty.

SUMMARY OF THE INVENTION

The present invention provides carrier retarders for power and free conveyor systems, particularly for systems which employ sloped gravity advancing tracks. The apparatus described herein is useful in retarding the movements of carriers along lines to arrest acceleration of the carriers, to control their speed, and to prevent damage caused by excessive decelerations.

In a preferred embodiment of the present invention a chain run is mounted adjacent a lower edge of a trolley track. A roller chain is mounted within the run, and the chain and run are coextensive with the track or at least that portion thereof along which retarding or driving of trolleys is desired. At one end of the chain run is attached a motor mounting for an electrical motor with a vertical shaft and appropriate apparatus to control the speed of an output shaft. The motor mounting may be attached directly to the trolley track. On the output shaft of the motor, a chain sprocket is mounted, and the roller chain passes about the sprocket. At the opposite end of the chain run an idler shaft and sprocket are rotatably connected to the trolley track.

In a preferred embodiment of the invention adjacent pins in a single link are extended from the chain below the run. A triangular block is pivotably mounted on one pin and the other pin is received in an arcuate groove in the block centered about the first pin, so that the block may pivot about the first pin in an amount which is limited by the groove and second pin. The block or retaining dog has a generally right triangular shape, with the pivot pin being attached near an intersection of a hypotenuse and a leg of the triangle, and the groove extending from a point near the intersection of the two legs of the triangle toward the hypotenuse. The retaining dog is spring loaded, and in its operational position, that is extended from the chain into the path of a trolley moving in the track, one leg of the triangular dog is parallel to the chain, the second motion limiting pin is in the groove in a position closes to that leg, the sloping face of the dog is forward in the direction of movement of trolleys and the chain, and a rearward leg perpendicularly projects from the chain beneath the track in the path of the trolleys. As trolleys roll down the track, they engage the rear face of the retaining dog and are retained by that dog against movement faster than provided by the motor until they reach the lowest available position on the track. Often the trolleys are deposited at the rear of an accumulated line of trolleys, and the retaining dog moves forward with the sloping forward face engaging stopped trolleys, causing the dog to pivot against spring pressure so that the dog clears the trolleys without pushing them and jamming them forward. The retaining dogs are spaced sufficiently far apart on the chain so that a trolley fits conveniently between adjacent dogs. The dogs are preferrably placed sufficiently close together so that only one trolley may ride upon a single dog, and so that the trolleys may not gain excess momentum and speed before they approach a dog.

In most warehousing systems the main track and the driving means proceed past the entrance to a gravity storage track. While the main track may be switched to the storage track in a conventional manner, special provision is required to drive the trolleys onto the storage track. Often separate motors and drive chains or "sweeps" are used to drive the trolleys onto a spur track. The present invention drives the trolleys onto the auxiliary track using the same apparatus employed to retard the fall of the trolleys down the gravity track. At appropriate places along the storage track where driving engagement of the retaining dogs with the trolleys is required, backing plates or bars are mounted beneath the chain runs so that the rear faces or legs of the retaining dogs will abut the bars to prevent yielding of the dogs against spring pressure when the dogs overtake engaged trolleys in the track. Thus, for that portion of the track along which the backing bar extends, the retaining dogs operate to drive trolleys.

It is usually convenient to mount the storage track and the chain run and chain drive motor rigidly with respect to the main track. A short section of track is then movably mounted with respect to the storage track and the main track so that the appropriate switching action may take place. In order that the retaining dogs may continuously sweep through the portion of the main track which is adjacent to the storage track, the backing bar is movably mounted so that it is placed in operative position only when the switch is aligned to direct trolleys onto the storage track. At all other times, the backing bar is withdrawn so that retaining dogs which overtake trolleys in the main track simply override those trolleys without pushing them forward. A convenient way in which to mount the backing bar is to have a curved backing bar pivoted at one end and moved by a solenoid connected to the bar at a distance from that end. It is also convenient to innerconnect the backing bar and switch so that the two are moved into operative switching position at the same time.

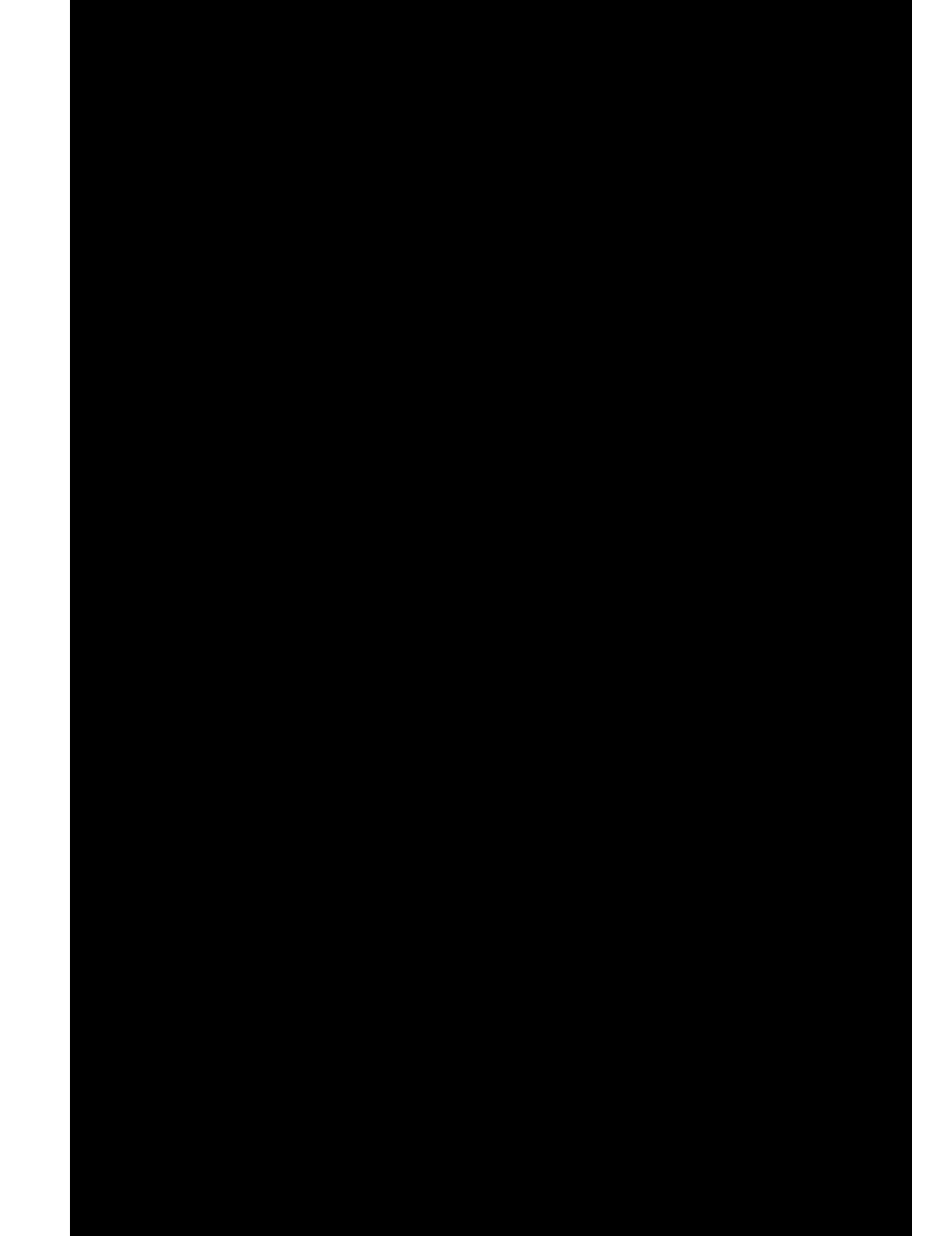

a chain mounted on the support means for movement along the conveyor, the chain having links and pins perpendicular to the links and interconnecting the links;

controlling means connected to the chain for controlling movement of the chain along the conveyor; and dog blocks movably mounted on the chain for movement therewith along the conveyor and for movement toward and away from the conveyor and thereby into and out of contact with articles moving along the conveyor, each of the blocks having a generally triangular shape and having a sloped forward portion sloping outward and rearward from the chain, a rear portion generally perpendicular to the chain and a base portion parallel to the chain, first pins of the chain extending into the blocks near intersections of the forward and base portions, and second pins of the chain extending into grooves in the blocks near intersections of the rear and base portions whereby the blocks pivot on the first pins with the grooves moving along the second pins, and extension means connected to the chain and to the blocks for urging the blocks outward until the second pins are in ends of the grooves closest to intersections of the rear and base portions.

2. Motion controlling means of claim 1 wherein the extension means comprise wire springs connected to the second pins, passed around the first pins, connected to the blocks remote from the first pins, and stressed to hold the second pins at extremities of the grooves.

3. Motion controlling apparatus of claim 1 further comprising:

disabling means mounted adjacent at least a portion of the conveyor and the support means parallel to the carrying means for contacting the block means, disabling the retracting means, and preventing the block means from bypassing articles on the conveyor for at least a portion of the conveyor.

4. Motion controlling apparatus of claim 3 wherein the conveyor comprises a storage conveyor and wherein the apparatus further comprises a line conveyor selectively connectable to the storage conveyor and positioning means connected to the disabling means for moving the disabling means into and out of operative position with respect to the block means, and wherein the disabling means is mounted adjacent the line conveyor whereby the disabling means is selectively moved into operative position to cause articles to be driven between the line conveyor and the storage conveyor.

5. Motion controlling apparatus of claim 4 further comprising conveyor interconnecting means movably mounted with respect to the line conveyor and storage conveyor to selectively interconnect the line conveyor and storage conveyor, and wherein the positioning means is connected to the conveyor interconnecting means, to move the disabling means into operative position when the conveyors are connected, whereby the block means drive articles between the main and storage conveyors.

6. A material handling system having a main conveyor with devices supported for movement therealong, having driving means substantially parallel to the main conveyor for moving devices therealong, and having at least one gravity conveyor connected to the main transporting line and inclined with respect thereto, the improvement comprising a retarder having support means adjacent the gravity conveyor, a chain mounted on the support means for movement along the gravity line, the chain having parallel pins and links inner connecting the pins, motive means connected to the chain for controlling the motion of the chain along the gravity conveyor, first extended pins connected to the chain means, blocks pivotably mounted on the first pins for movement toward the gravity conveyor, second pins of the chain extended in the direction of the blocks and passing into grooves in the blocks, whereby blocks may pivot upon first pins and may move about first pins to extents in which grooves in the blocks may move along second pins for preventing excess pivoting of the blocks toward the gravity conveyor, spring means urging the blocks toward the gravity conveyor, and overriding means comprising outward and rearward sloped forward faces on each of the blocks for pivoting the blocks away from the gravity conveyor when blocks overtake devices on the gravity conveyor, whereby the blocks are obstructively positioned along the gravity conveyor and are moved along the gravity conveyor in the direction of gravitational flow by the chain means and motive means, whereby devices moving along the gravity conveyor contact the blocks and are prevented from moving along the gravity conveyor in speeds in excess of the speed of the blocks.

7. In a free trolley conveyor system, hold back dog apparatus comprising chain means mounted along a conveyor, the chain means having first and second pins, generally triangularly shaped blocks mounted on the chain means, the blocks having sloping forward faces in a forward direction of the chain means, the forward faces sloping rearward and away from the chain means, rearward faces of the blocks extending substantially perpendicular to the chain means, and base portions of the blocks extending along the chain means, the first pins being connected to the blocks near angles formed between the sloping forward faces and the base portions, grooves extending from areas near intersections of the rear faces and the base portions toward the sloping faces, and springs being fixed to the block near intersections of the sloping faces and the rear faces extending around the first pins and overlying the second pins on sides thereof away from intersections of the rear faces and base portions.

8. The system of claim 7 further comprising bar means mounted along at least a portion of the chain means on a side thereof opposite the conveyor, the bar means bearing against base portions of the blocks to prevent blocks from overriding trolleys which the blocks overtake.

9. The system of claim 8 wherein the bar means is mounted for motion with respect to the chain means to move into and out of operative engagement with the blocks.